Jan. 30, 1940.　　　L. GOLDHAMMER ET AL　　　2,188,711
ROLL FILM CAMERA WITH EXPOSURE METER
Filed July 1, 1936
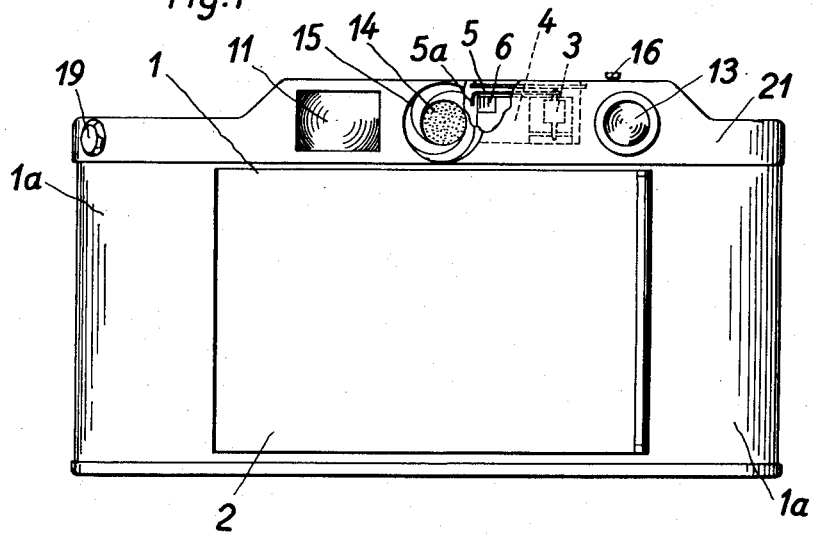
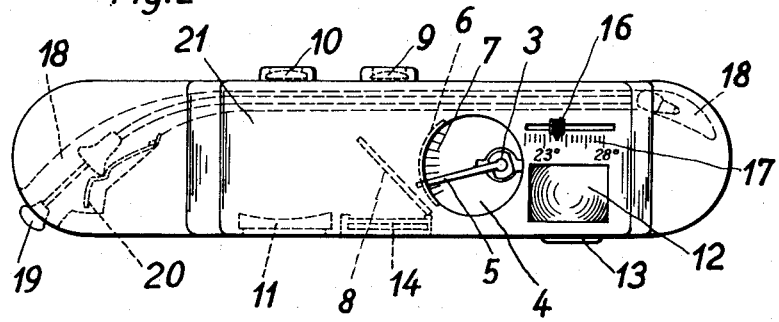
Leo Goldhammer
Siegfried Gelius
Inventors
By Their Attorneys Patented Jan. 30, 1940

2,188,711

UNITED STATES PATENT OFFICE 2,188,711

ROLL FILM CAMERA WITH EXPOSURE METER

Leo Goldhammer and Siegfried Gelius, Munich, Germany, assignors, by mesne assignments, to Agfa Ansco Corporation, Binghamton, N. Y., a corporation of Delaware Application July 1, 1936, Serial No. 88,348
In Germany July 3, 1935

7 Claims. (Cl. 88—23)

The present invention relates to a roll film-small-size camera provided with an exposure meter.

One of its objects is to arrange the exposure meter on the narrow top side of a small size camera. Another object is to provide means for reading the scale of the exposure meter from above in chest-level or from the side in eye-level. Further objects will be seen from the detailed specification following hereafter.

In the accompanying drawing in which is shown one embodiment of the invention:

Fig. 1 is the front view of a roll film camera on the top narrow side of which a direct vision finder, a photo-electric exposure meter and a brilliant finder are mounted.

Fig. 2 is a plan view of the same camera in which also the pocket for housing the antinous release is illustrated.

It has already been proposed to mount photo-electric-measuring-instruments in or on photographic cameras. Mainly box-cameras or cinematographic cameras have been provided with built-in exposure meters because they have room enough for housing the measuring instruments. It is also known, to secure the blocking-layer cell and the galvanometer to the lens-board of photographic roll film cameras. However, this construction makes the camera very unhandy. Moreover the photo-electric measuring instrument may easily be damaged on behalf of its exposed position.

It has been found that it is possible to give the magnet of the galvanometer such a shape that it may be mounted on the narrow side of a photographic roll film small-size camera without any disadvantage to the sensitivity of the instrument.

As compared with a normal instrument the diameter of the magnet has been greatly diminished, so that it is not larger than the diameter of the coil and the height (length) of the magnet has been increased. The magnetic flux is not diminished by this procedure, on the contrary by means of the greater length of the magnet the sensitiveness of the measuring instrument could be increased over instruments with a larger diameter of the magnet.

According to the invention a mirror is provided beside the moving-coil instrument in order to enable a person to read the instrument when holding the camera in eye-level, without it being necessary to increase the size of the camera. For observing the scale of the measuring instrument in this position, a special magnifying lens has been mounted close to the peephole of the direct-vision finder. Moreover the free end of the hand of the galvanometer is bent downwards so that the point of the hand can play over a second scale arranged perpendicularly to the normal one. There are provided special finders for reading the instrument from above as well as in eye-level. By this arrangement the brightness of the object to be taken may be measured at the same time as or immediately after the picture to be taken has been chosen. The direct-vision finder, the observing-mirror, the measuring instrument, the photo-electric cell, the resistance, and the brilliant finder are arranged one beside the other, in such a way as to make the best possible use of the space on the narrow top side of a roll film camera. By bending the hand of the galvanometer into the space between the two horizontal planes enclosing the magnet, the measuring instrument is only enlarged in horizontal direction. This does not matter as there is room enough between the spool chambers in this direction. The single parts may be either fixedly built into the camera or mounted on the camera and protected by a cap. The hollow space between the single parts may be used for housing and keeping the wire release.

According to the invention a galvanometer 3 the magnet 4 of which is adapted to the shape of the camera, is arranged on the longitudinal top side 1 of a photographic roll film camera 2 between the spool chambers 1a. The outside diameter of the magnet 4 is not or not essentially larger than that of the spool chambers, so that the camera housing need not be enlarged. The necessary magnetic flux is attained by a slight increase in the height (length) of the magnet. The pointer 5 of the measuring instrument is bent downwards at its free end 5a, in order to be able to take readings in eye-level from the side and in chest-level from above. This bent end 5a plays over a scale 6 which is arranged perpendicularly to the normal one, which is to be observed from above. By means of the mirror 8 and the magnifying lens 9 it is possible to read the scale 6 of the measuring instrument also in eye-level immediately after the object to be taken has been observed through the direct-vision finder 10, 11. The peep-holes 9 and 10 are arranged side by side. At the same time the scale 7 is arranged close by the top part 12 of the brilliant-finder 12, 13. The space in front of the mirror 8 is used for housing the blocking-layer cell 14. The aperture of the blocking-layer cell 14 is adjustable in well known manner by means of a diaphragm 15 which can be varied in conformity with the diaphragm of the objective. The speed of the photographic material is reckoned in by adjustment of a resistance put in the circuit of the blocking-layer cell. This adjustment is made by a slide 16 which is movable in relation to the scale 17. The free space between the single parts 7—12 is developed as a pocket for keeping the wire release 19. A catch spring 20 prevents the antinous release from sliding out of the camera 18. In this embodiment of the invention the parts 3—20 are mounted on the camera casing 2 and covered by a cap 21.

What we claim is:

1. In combination, a photoelectric exposure meter provided with a measuring instrument, a camera having a top wall and a rear wall, said measuring instrument being positioned in the upper portion of said camera, means in said top wall for directly observing and reading the measuring instrument from above, means within said camera and fixedly mounted with respect to said top and rear walls for reflecting the indication of said measuring instrument toward the rear wall of said camera, and means in said rear wall to permit the observation of the reflected indication of said measuring instrument.

2. In combination, a camera casing having a top side portion provided with front, rear and top walls, a view finder having a lens in said front wall and an eye piece in said rear wall for viewing an object through said portion at eye level, a second view finder having a lens in said front wall and an eye piece in said top wall for viewing an object from the top of said portion, light sensitive means in said portion, an indicating device in said portion responsive to said light sensitive means, and means to permit the observation of said indicating device through both said rear and top walls.

3. In combination, a camera casing having a top side portion provided with front, rear and top walls, a view finder having a lens in said front wall and an eye piece in said rear wall for viewing an object through said portion at eye level, a second view finder having a lens in said front wall and an eye piece in said top wall for viewing an object from the top of said portion, light sensitive means in said portion, an indicating device in said portion responsive to said light sensitive means and provided with two scales, one on the side and one on the top of said device, and means to permit the observation of said indicating device through both said rear and top walls, said last named means comprising an eye piece in said rear wall through which the scale on the side of said indicating device is visible and an opening in said top wall through which the like scale on the top of said indicating device is visible.

4. In combination, a camera casing having a top side portion provided with front, rear and top walls, a view finder having a lens in said front wall and an eye piece in said rear wall for viewing an object through said portion at eye level, a second view finder having a lens in said front wall and an eye piece in said top wall for viewing an object from the top of said portion, light sensitive means in said portion, an indicating device in said portion responsive to said light sensitive means and provided with two scales, one on the side and one on the top of said device, and means to permit the observation of said indicating device through both said rear and top walls, said last named means comprising an eye piece in said rear wall through which the scale on the side of said indicating device is visible and an opening in said top wall through which the like scale on the top of said indicating device is visible, and a mirror in said portion for reflecting the image of the first named scale to said last named eye piece.

5. In combination, a camera casing having a top side portion provided with front, rear and top walls, a view finder having a lens in said front wall and an eye piece in said rear wall for viewing an object through said portion at eye level, a second view finder having a lens in said front wall and an eye piece in said top wall for viewing an object from the top of said portion, light sensitive means in said portion, an indicating device in said portion responsive to said light sensitive means and provided with two scales, one on the side and one on the top of said device, and means to permit the observation of said indicating device through both said rear and top walls, said last named means comprising an eye piece in said rear wall through which the scale on the side of said indicating device is visible and an opening in said top wall through which the like scale on the top of said indicating device is visible, and a mirror in said portion for reflecting the image of the first named scale to said last named eye piece, said first and last named eye pieces being disposed adjacent each other in said rear wall.

6. In combination, a camera casing having a top side portion provided with front, rear and top walls, a view finder having a lens in said front wall and an eye piece in said rear wall for viewing an object through said portion at eye level, a second view finder having a lens in said front wall and an eye piece in said top wall for viewing an object from the top of said portion, light sensitive means in said portion, an indicating device in said portion responsive to said light sensitive means and provided with two scales, one on the side and one on the top of said device, and means to permit the observation of said indicating device through both said rear and top walls, said last named means comprising an eye piece in said rear wall through which the scale on the side of said indicating device is visible and an opening in said top wall through which the like scale on the top of said indicating device is visible, and a mirror in said portion for reflecting the image of the first named scale to said last named eye piece, said first and last named eye pieces being disposed adjacent each other in said rear wall, and said second named eye piece and said opening being disposed adjacent each other in said top wall.

7. In combination, a camera casing having a top side portion provided with front, rear and top walls, a view finder having a lens in said front wall and an eye piece in said rear wall for viewing an object through said portion at eye level, a second view finder having a lens in said front wall and an eye piece in said top wall for viewing an object from the top of said portion, light sensitive means in said portion, an indicating device in said portion responsive to said light sensitive means and provided with two scales, one on the side and one on the top of said device, and means to permit the observation of said indicating device through both said rear and top walls, said last named means comprising an eye piece in said rear wall through which the scale on the side of said indicating device is visible and an opening in said top wall through which the like scale on the top of said indicating device is visible, said indicating device having a single pointer operable over both scales.

LEO GOLDHAMMER.
SIEGFRIED GELIUS.